Aug. 26, 1958 J. HUFF 2,848,732
CASTER WHEEL MOUNTING
Filed May 18, 1956
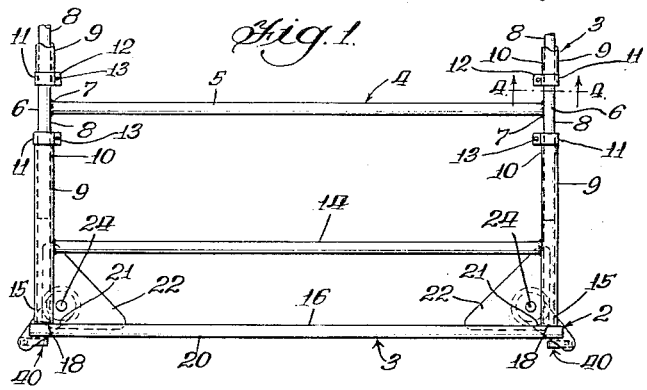
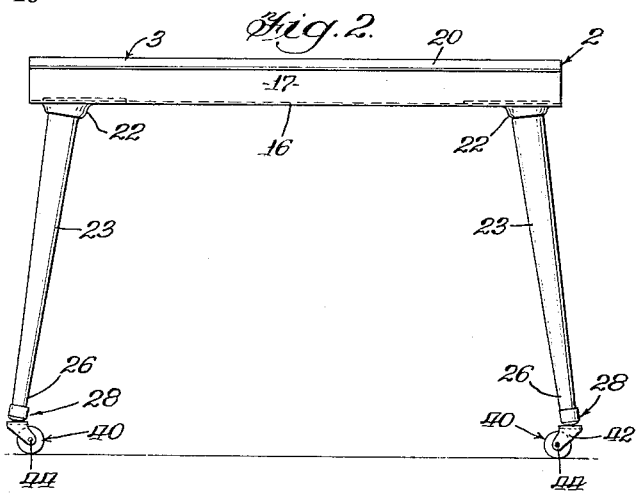
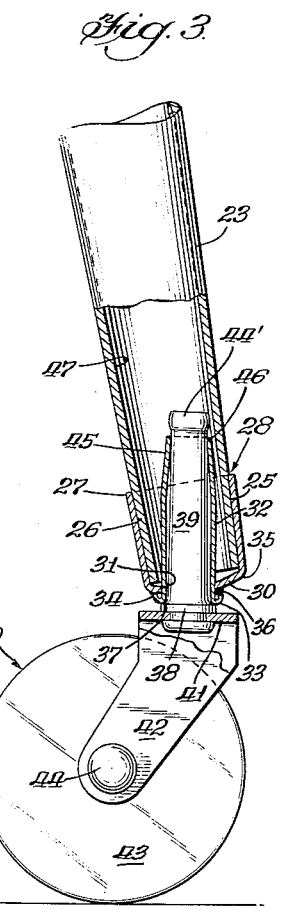
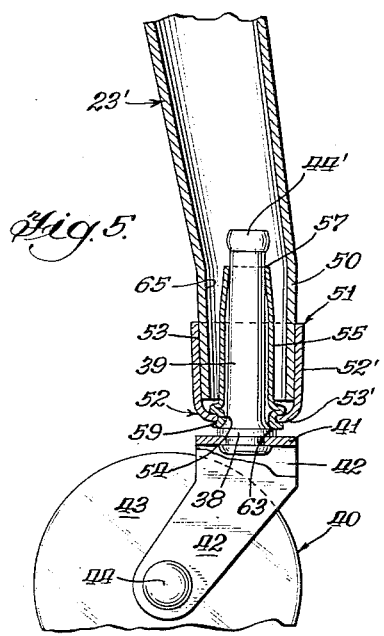
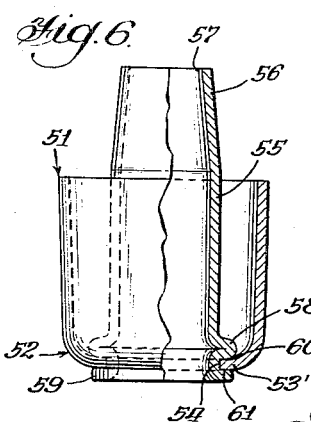
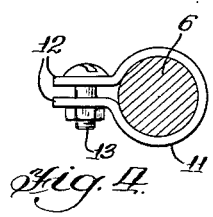
INVENTOR.
John Huff
BY John J. Kowalik
Atty.

United States Patent Office 2,848,732
Patented Aug. 26, 1958

2,848,732

CASTER WHEEL MOUNTING

John Huff, Chicago, Ill.

Application May 18, 1956, Serial No. 585,759

2 Claims. (Cl. 16—38)

This invention relates to supported structures and caster wheels therefor and more specifically to a novel interrelation between the supported structure and such caster wheels.

A general object of the invention is to provide a supported structure such as a table with caster wheels for its legs of simple, economical and rugged construction which will perform effectively in service.

Caster wheel supports for furniture such as tables, for example, are usually provided by drilling holes or bores in the lower ends of solid legs and the caster spindles inserted in such leg. This requires that the leg be solid and further that the bore be vertically disposed for otherwise the wheel does not caster properly. Any displacement of the leg also displaces the bore so that alignment is extremely difficult.

A more specific object of the invention is to provide a novel, adjustable caster wheel assembly for furniture legs wherein hollow, conical and inclined legs are used.

A still further object is to provide a novel adjustable assembly which comprises a caster-wheel-spindle receiving sleeve connected to a ferrule which is adapted to have a wedging fit with an associated conical leg and wherein the sleeve is movable to locate the spindle vertically attendant to deflection of the base of the ferrule or rotation thereof.

These and other objects of the invention will be more readily apparent from the following specification and drawings, wherein:

Figure 1 is a fragmentary plan view of a table incorporating the invention.

Figure 2 is a side elevational view of the structure shown in Figure 1.

Figure 3 is an enlarged side elevational view of one of the legs and caster wheel assembly shown partially in vertical section.

Figure 4 is an enlarged sectional view on line 4—4 of Figure 1.

Figure 5 is a sectional view comparable to Figure 3 of a modification of the invention; and Figure 6 is an enlarged side elevational view of the ferrule of Figure 5 partially broken away and in vertical section.

Having particular reference to the drawings, there is shown a table or supported structure generally designated 2 which comprises two bilaterally symmetrical end portions 3, 3 and an interconnecting center portion 4.

The center part 4 is H-shaped in plan and comprises a cross bar 5 and a pair of side bars 6, 6 connected intermediate their ends as at 7, 7 to opposite ends of the bar 5. The opposite extremities 8, 8 of the legs 6, 6 telescope into tubular side members 9, 9, of each end portion 3.

The inner end 10 of each member 9 is provided with a split collar 11 which includes outturned lugs 12 clamped together by a bolt 13 for locking engagement with the extremities 8 of the associated leg 6. The table is thus adjustable lengthwise. The members 9 are interconnected intermediate their ends by a cross-bar or rod 14 and at their outer extremities 15, 15 to an end rail 16 which includes a plate-like portion 17 preferably welded at 18, 18 to the end portions 15 of the side beams 9. The end rail 16 is preferably provided along the upper edge of the plate portion 17 with a scroll upper edge 20.

The corners 21, 21 developed by members 9 and 16 are bridged by underlying brackets 22 which are preferably welded to the members 9 and 16 and provide an attachment for the upper ends of tubular conical legs 23 via bolts 24 in circumferentially adjustable positions as set forth in my co-pending application entitled Fastening Device for Furniture Legs Serial No. 552,168 filed December 9, 1955, now U. S. Patent No. 2,809,876.

Each leg 23 is hollow and tapers downwardly and terminates in a narrow lower end 26 and sockets with its external side 25 in a wedge fit into a complementary sleeve portion 27 of a cup-like ferrule generally designated 28.

The ferrule 28 has a bottom web or wall 30 integral with the sleeve portion 27 and the bottom wall is provided with an aperture or hole 31 disposed at one side of center. Through this aperture 31 extends a sleeve or holder 32 disposed at an angle to the longitudinal axis of the leg and the angle is so chosen that in at least one position of the ferrule assembly circumferentially of the leg, the holder 32 will position substantially vertically attendant to rotation of the assembly about the leg. The holder 32 has an outturned radial bead-like flange 33 at its lower end which abuts as at 34 against the underside 35 of the bottom wall 30 of the ferrule and is tack welded thereto as at 36.

The bead flange 33 provides a bearing as at 37 for the shoulder 38 at the lower end of the spindle 39 of the caster wheel structure generally designated 40. The lower end of the spindle is riveted to the bight portion 41 of an inverted U-shaped bracket which with its depending legs 42, 42 flanks a wheel 43 which is journaled on a horizontal pin 44 projected through the lower ends of the legs 42 and headed at opposite ends to interlock therewith. The upper end of the spindle projects through an upwardly coned portion 45 of the holder 32, and has a bulbous upper extremity 44' which is adapted to expand the conical part 45 attendant to insertion and withdrawal of the spindle relative to the holder. It will be observed that the upper extremity 46 of the spindle and holder combination is slightly spaced from the interior periphery 47 of the related leg which in conjunction with the flexibility of the bottom wall serves to cushion shocks which are imposed against the wheel when it strikes any obstruction as the table is being rolled by deflecting the wall 30.

There is provided a further adjustment of the legs 23 in a horizontal plane by the collars 11 in that if any leg requires slight horizontal adjustment, the collar on the adjacent side member 9 is loosened and the leg pulled in or out with attendant rotation of the related member 9 and deflection of the members 14 and 16. The bolt 13 is then tightened and relaxation of the stresses is resisted by the center structure 4.

Thus a novel and economical caster wheel structure is provided which is adjustable in both vertical and horizontal planes and which obtains a cushioning action when the wheels strike obstructions.

Referring now to Figures 5 and 6, there is shown a modification wherein identical parts to the previous embodiment are identified by corresponding reference numerals. The leg 23' of the previous embodiment has a lower end portion 50 which is bent to extend vertically and its vertical disposition is controlled by rotation of the entire leg about the bolt 24. In the present embodiment the mounting generally designated 51 for the caster wheel structure 40 comprises the cup-like ferrule 52 which includes a peripheral conical sleeve portion 52' in complementary fit with the outer periphery 53 of the lower end of the leg 23'. The ferrule has a bottom wall or web 53' which has an aperture 54 centrally located and receiving a spindle holder 55. The holder 55 comprises a tube which has a tapered upper portion 56 with an upper diameter at 57 substantially equal to the diameter of the spindle. The lower end of the holder 55 is provided with inner and outer beads or circumferential flanges or shoulders 58 and 59 which are formed by crimping or upsetting the metal of the holder and tightly pressing the same against the inner and outer sides 60 and 61 of the bottom wall 53' of the ferrule 52. It will be seen that the shoulder 58 at the lower end of spindle 39 has a bearing as at 63 with the outer flange 59. It will be understood that the ferrule of the instant embodiment as well as that previously described is preferably metallic such as steel although it may be of plastic or any other deformable or resilient material. In the instant design the structure has more flexibility than the previous inasmuch as the holder 55 is essentially centered in the lower portion 50 of the leg 23' and is spaced a greater distance from the interior periphery 65 of the leg 23' than in the previous embodiment. Thus in addition to the adjustment of the table side members the holder 55 may be adjusted by bending the bottom wall 53' by canting the caster wheel assembly 40.

It will be understood that in either embodiment the upper part of the holder is of substantially the diameter of the spindle and is deformable to pass the head 44' therethrough and retain the caster from slipping out when the supported structure is lifted off the ground.

Those skilled in the art will appreciate the simplicity of the mounting for the castering assembly of the present invention, the ease of manufacturing and assembling the components, the strength and deflection of the caster wheel mountings and the ease of adjustability of the casters so that they perform effectively.

It will, of course, be understood that various details of construction may be varied through a wide range without departing from the principles of this invention and it is, therefore, not the purpose to limit the patent granted hereon otherwise than necessary by the scope of the appended claims.

I claim:
1. A ferrule for a device of the class described including an annular sleeve portion and a transverse wall portion integral with one end of the sleeve portion and having an aperture therethrough and a spindle holder extending within the sleeve portion in radially spaced relation thereto and having one end connected to said ferrule, and means connecting said one end to said wall about said opening, said wall being deformable whereby accommodating canting of said holder to adjust its position relative to the ferrule said aperture being eccentrically disposed on said bottom wall and said holder being an elongated tube and extending from said aperture into said sleeve portion diagonally to the principal axis of the ferrule at such an angle thereto that in one of the positions of the holder circumferentially of said axis said holder is disposed vertically at a given inclination of said axis to the vertical.

2. A caster wheel mounting for a hollow leg having an open lower end, a ferrule having a sleeve portion over said end and having a bottom wall beneath the same and said bottom wall having an aperture therein, a spindle holder within the hollow leg and having a lower end connected to said bottom wall within said aperture, a caster wheel assembly having a spindle extending into said holder, said aperture disposed off-center on said bottom wall and said holder extending transversely athwart the principal axis of the leg and movable with said ferrule circumferentially of the leg to adjust the angular disposition of the holder with respect to the axis of the leg.

References Cited in the file of this patent

UNITED STATES PATENTS

| | | |
|---|---|---|
| 816,211 | Bischoff | Mar. 27, 1906 |
| 940,780 | Bent | Nov. 23, 1909 |
| 1,671,736 | Meeker | May 29, 1928 |
| 1,689,031 | Hossard | Oct. 23, 1928 |
| 1,888,036 | Herold | Nov. 15, 1932 |
| 1,918,604 | Johnson | July 18, 1933 |
| 2,472,903 | Kamholtz | June 14, 1949 |
| 2,750,242 | Viehmann | June 12, 1956 |